United States Patent
Dunton et al.

(10) Patent No.: US 9,024,864 B2
(45) Date of Patent: May 5, 2015

(54) USER INTERFACE WITH SOFTWARE LENSING FOR VERY LONG LISTS OF CONTENT

(75) Inventors: Randy R Dunton, Phoenix, AZ (US); Mariano J Phielipp, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1084 days.

(21) Appl. No.: 11/761,874

(22) Filed: Jun. 12, 2007

(65) Prior Publication Data

US 2008/0309614 A1    Dec. 18, 2008

(51) Int. Cl.
| | |
|---|---|
| G09G 5/00 | (2006.01) |
| H04N 7/10 | (2006.01) |
| H04N 7/025 | (2006.01) |
| G06F 3/00 | (2006.01) |
| H04N 5/44 | (2011.01) |
| G06F 3/0482 | (2013.01) |
| G06F 3/0485 | (2013.01) |
| H04N 21/422 | (2011.01) |
| H04N 21/482 | (2011.01) |

(52) U.S. Cl.
CPC ............ H04N 5/4403 (2013.01); G06F 3/0482 (2013.01); G06F 3/04855 (2013.01); G06F 2203/04805 (2013.01); H04N 21/42204 (2013.01); H04N 21/482 (2013.01); H04N 2005/4428 (2013.01)

(58) Field of Classification Search
CPC ........ G06F 3/048–3/0486; G06F 2203/04801; H04N 5/4403–5/44504; H04N 5/44543; H04N 2005/44547–2005/44578; H04N 21/42204; H04N 21/482–21/4828

USPC .................................................. 345/156–178
See application file for complete search history.

(56) References Cited

U.S. PATENT DOCUMENTS

| | | | |
|---|---|---|---|
| 5,241,619 | A | 8/1993 | Schwartz et al. |
| 5,545,857 | A | 8/1996 | Lee et al. |
| 5,598,187 | A | 1/1997 | Ide et al. |
| 5,644,652 | A | 7/1997 | Bellegarda et al. |
| 5,687,370 | A | 11/1997 | Garst et al. |
| 5,710,831 | A | 1/1998 | Beernink et al. |
| 5,764,799 | A | 6/1998 | Hong et al. |

(Continued)

FOREIGN PATENT DOCUMENTS

| | | |
|---|---|---|
| CN | 1342365 A | 3/2002 |
| EP | 1759276 A4 | 4/2009 |

(Continued)

OTHER PUBLICATIONS

Office Action from corresponding foreign application in Taiwan, application No. 97119513, mailed Jul. 1, 2011; 11 pages.

(Continued)

Primary Examiner — Patrick F Marinelli
(74) Attorney, Agent, or Firm — Garrett IP, LLC

(57) ABSTRACT

A user interface with software tensing may be described. An apparatus may include a user interface module to display an index list, a software lens list, and an aperture box. The index list may represent a list of available options. The software lens list may display a sub-set of the list of available options that coincides with a position of the aperture box on the index list. The apparatus may also include a media lensing module to increase a size of an option in the software lens list when a pointer approaches or coincides with the option. Other embodiments are described and claimed.

15 Claims, 5 Drawing Sheets

(56) References Cited

U.S. PATENT DOCUMENTS

| | | | |
|---|---|---|---|
| 5,835,156 A * | 11/1998 | Blonstein et al. | 725/38 |
| 5,861,885 A | 1/1999 | Strasnick et al. | |
| 5,912,668 A * | 6/1999 | Sciammarella et al. | 715/788 |
| 5,977,974 A | 11/1999 | Hatori et al. | |
| 5,978,043 A * | 11/1999 | Blonstein et al. | 348/569 |
| 6,005,973 A | 12/1999 | Seybold et al. | |
| 6,014,666 A | 1/2000 | Helland et al. | |
| 6,084,577 A | 7/2000 | Sato et al. | |
| 6,084,598 A | 7/2000 | Chekerylla | |
| 6,133,962 A * | 10/2000 | Proehl et al. | 725/44 |
| 6,166,733 A * | 12/2000 | Yamada | 715/776 |
| 6,181,329 B1 | 1/2001 | Stork et al. | |
| 6,195,089 B1 * | 2/2001 | Chaney et al. | 725/56 |
| 6,281,940 B1 | 8/2001 | Sciammarella | |
| 6,288,718 B1 * | 9/2001 | Laursen et al. | 715/800 |
| 6,340,967 B1 | 1/2002 | Maxted | |
| 6,344,865 B1 * | 2/2002 | Matthews et al. | 715/815 |
| 6,407,779 B1 | 6/2002 | Herz | |
| 6,425,129 B1 | 7/2002 | Sciammarella et al. | |
| 6,492,981 B1 | 12/2002 | Stork et al. | |
| 6,499,036 B1 | 12/2002 | Gurevich | |
| 6,573,887 B1 | 6/2003 | O'Donnell, Jr. | |
| 6,577,350 B1 * | 6/2003 | Proehl et al. | 348/564 |
| 6,640,337 B1 * | 10/2003 | Lu | 725/39 |
| 6,763,522 B1 * | 7/2004 | Kondo et al. | 725/39 |
| 6,781,610 B2 | 8/2004 | Os et al. | |
| 6,788,815 B2 | 9/2004 | Lui et al. | |
| 6,831,632 B2 | 12/2004 | Vardi | |
| 6,832,355 B1 | 12/2004 | Duperrouzel et al. | |
| 6,857,128 B1 * | 2/2005 | Borden et al. | 725/39 |
| 6,880,132 B2 | 4/2005 | Uemura | |
| 6,989,822 B2 | 1/2006 | Pettiross et al. | |
| 7,036,092 B2 * | 4/2006 | Sloo et al. | 715/841 |
| 7,068,288 B1 | 6/2006 | Good et al. | |
| 7,093,202 B2 | 8/2006 | Saund et al. | |
| 7,096,432 B2 | 8/2006 | Huapaya et al. | |
| 7,111,016 B2 | 9/2006 | Gurevich | |
| 7,143,362 B2 * | 11/2006 | Dieberger et al. | 715/764 |
| 7,171,353 B2 | 1/2007 | Trower, II et al. | |
| 7,174,042 B1 | 2/2007 | Simmons et al. | |
| 7,184,591 B2 | 2/2007 | Thiesson et al. | |
| 7,203,938 B2 | 4/2007 | Ambrose et al. | |
| 7,259,752 B1 | 8/2007 | Simmons | |
| 7,263,668 B1 | 8/2007 | Lentz | |
| 7,272,818 B2 | 9/2007 | Ishimitsu et al. | |
| 7,283,126 B2 | 10/2007 | Leung | |
| 7,342,575 B1 | 3/2008 | Hartwell et al. | |
| 7,350,158 B2 * | 3/2008 | Yamaguchi et al. | 715/834 |
| 7,362,901 B2 | 4/2008 | Walch | |
| 7,379,778 B2 | 5/2008 | Hayes et al. | |
| 7,383,503 B2 | 6/2008 | Banks | |
| 7,434,177 B1 * | 10/2008 | Ording et al. | 715/862 |
| 7,451,408 B2 * | 11/2008 | Chan | 715/853 |
| 7,460,712 B2 | 12/2008 | Thiesson et al. | |
| 7,506,271 B2 | 3/2009 | Wang et al. | |
| 7,523,412 B2 * | 4/2009 | Jones et al. | 715/787 |
| 7,676,759 B2 * | 3/2010 | Carter | 715/783 |
| 7,730,426 B2 | 6/2010 | Slawson et al. | |
| 7,870,508 B1 * | 1/2011 | Wright et al. | 715/853 |
| 8,010,980 B1 * | 8/2011 | Mohr et al. | 725/48 |
| 8,621,373 B2 * | 12/2013 | Burtner et al. | 715/764 |
| 2002/0057336 A1 * | 5/2002 | Gaul et al. | 348/47 |
| 2002/0069220 A1 | 6/2002 | Tran | |
| 2002/0109728 A1 * | 8/2002 | Tiongson et al. | 345/786 |
| 2002/0163511 A1 | 11/2002 | Sekendur | |
| 2002/0186252 A1 * | 12/2002 | Himmel et al. | 345/787 |
| 2003/0001899 A1 | 1/2003 | Partanen et al. | |
| 2003/0071850 A1 | 4/2003 | Geidl | |
| 2003/0117427 A1 | 6/2003 | Haughawout et al. | |
| 2003/0120600 A1 | 6/2003 | Gurevich | |
| 2003/0122804 A1 | 7/2003 | Yamazaki et al. | |
| 2003/0137542 A1 * | 7/2003 | Zimmerman et al. | 345/764 |
| 2003/0142065 A1 | 7/2003 | Pahlavan | |
| 2003/0214540 A1 | 11/2003 | Huapaya et al. | |
| 2003/0231167 A1 | 12/2003 | Leung | |
| 2004/0008228 A1 * | 1/2004 | Smith | 345/780 |
| 2004/0021700 A1 | 2/2004 | Iwema et al. | |
| 2004/0160463 A1 * | 8/2004 | Battles et al. | 345/814 |
| 2004/0234128 A1 | 11/2004 | Thiesson et al. | |
| 2004/0250217 A1 * | 12/2004 | Tojo et al. | 715/810 |
| 2005/0091604 A1 * | 4/2005 | Davis | 715/772 |
| 2005/0099398 A1 | 5/2005 | Garside et al. | |
| 2005/0110778 A1 | 5/2005 | Ben Ayed | |
| 2005/0210403 A1 * | 9/2005 | Satanek | 715/786 |
| 2005/0262442 A1 | 11/2005 | Soin et al. | |
| 2006/0143577 A1 | 6/2006 | Hsieh et al. | |
| 2006/0150103 A1 | 7/2006 | Chicles et al. | |
| 2006/0161867 A1 | 7/2006 | Drucker et al. | |
| 2006/0242599 A1 * | 10/2006 | Choo et al. | 715/821 |
| 2007/0152961 A1 * | 7/2007 | Dunton et al. | 345/156 |
| 2007/0154093 A1 * | 7/2007 | Dunton et al. | 382/186 |
| 2007/0157232 A1 * | 7/2007 | Dunton et al. | 725/37 |
| 2007/0247436 A1 * | 10/2007 | Jacobsen | 345/173 |
| 2008/0046837 A1 | 2/2008 | Beauchamp et al. | |
| 2008/0066007 A1 * | 3/2008 | Lau et al. | 715/783 |
| 2008/0137971 A1 | 6/2008 | King et al. | |
| 2008/0309614 A1 * | 12/2008 | Dunton et al. | 345/156 |
| 2008/0313674 A1 * | 12/2008 | Dunton et al. | 725/43 |
| 2008/0313675 A1 * | 12/2008 | Dunton | 725/46 |
| 2009/0027335 A1 | 1/2009 | Ye | |

FOREIGN PATENT DOCUMENTS

| | | |
|---|---|---|
| TW | 200905544 A | 4/2012 |
| WO | 01/33838 A1 | 5/2001 |
| WO | 02/089010 A1 | 11/2002 |
| WO | 2007/078886 A2 | 7/2007 |
| WO | 2007/078886 A3 | 5/2008 |

OTHER PUBLICATIONS

"Samsung Introduces World's First '3-dimensional Movement Recognition' Phone," Samsung, Jan. 12, 2005, from <http://www.samsung.com/us/news/newsPreviewRead.do?news_seq=2509>, printed Jun. 7, 2010, 2 pages.

European Search Report received for European Patent Application No. 0807406.4, mailed on Nov. 30, 2010, 3 pages Notice of Allowance received for Taiwan Patent Application No. 095147460, mailed on Aug. 18, 2010, 1 page of English Translation and 2 pages of Notice of Allowance.

Office Action received for Taiwan Patent Application No. 095147460, mailed on Apr. 19, 2010, 4 pages of Office Action only.

Notice of Grant received for Chinese Patent Application No. 200680044820.4, mailed on May 4, 2012, 1 page of English Translation and 2 pages of Notice of Grant.

Office Action received for Chinese Patent Application No. 200680044820.4, mailed on Sep. 25, 2009, 3 pages of English Translation and 4 pages of Office Action.

Office Action received for Chinese Patent Application No. 200680044820.4, mailed on Jun. 30, 2011, 1 page of English Translation and 3 pages of Office Action.

Choi et al., "Beatbox Music Phone: Gesture-based Interactive Mobile Phone using a Tri-axis Accelerometer," IEEE, Dec. 14, 2005, pp. 97-102.

"i-pen Bluetooth," FingerSystem U.S.A., Dec. 13, 2004, from <http://www.fingersystemusa.com/products/i-pen_bluetooth.php>, printed Aug. 11, 2009, 2 pages.

i-pen Manual, "i-pen Mouse User's Guide," copyright 2003, FingerSystem U.S.A., Inc., 16 pages.

Van West, Jeff, "Using Tablet PC: Handwriting Recognition 101," May 28, 2003, copyright 2008, Microsoft Corporation, from <http://www.microsoft.com/windowsxp/using/tabletpc/getstarted/vanwest_03may28hanrec.mspx>, printed Jan. 23, 2008, 9 pages.

Office Action received for Chinese Patent Application No. 200680044820.4, mailed on Jan. 26, 2011, 5 pages of English Translation and 5 pages of Office Action.

Oh et al., "Inertial Sensor Based Recognition of 3-D Character Gestures with an Ensemble of Classifiers," Proceedings of the 9th Int'l Workshop on Frontiers in Handwriting Recognition (IWFHR-9 2004), copyright 2004, IEEE, 6 pages.

(56) References Cited

OTHER PUBLICATIONS

International Preliminary Report on Patentability and Written Opinion received for PCT Patent Application No. PCT/US2006/048044, mailed on Jul. 10, 2008, 13 pages.

International Search Report and Written Opinion received for PCT Patent Application No. PCT/US2006/048044, mailed on Mar. 11, 2008, 19 pages.

Aitken, Peter, "Sams Teach Yourself Microsoft Word 2000," Changing the Appearance of Text > Selecting a Font, published by Sams, Apr. 28, 1999, Safari Books Online, from <http://proquest.safaribooksonline.com/067231441X/ch10lev1sec2>, printed Jan. 24, 2008, 5 pages.

Platte et al., "A New Intelligent Remote Control Unit for Consumer Electronic Devices," IEEE Transactions on Consumer Electronics, vol. CE-31, No. 1, Feb. 1985, pp. 59-69, 11 pages.

Notice of Allowance received for Taiwan Patent Application No. 97119513, mailed on Dec. 28, 2011, 1 page of English Translation and 2 pages of Notice of Allowance.

\* cited by examiner

USER INTERFACE WITH SOFTWARE LENSING FOR VERY LONG LISTS OF CONTENT

RELATED APPLICATIONS

This application is a related to a commonly owned U.S. patent application Ser. No. 11/323,088 titled "A User Interface For A Media Device" and filed on Dec. 30, 2005; a commonly owned U.S. patent application Ser. No. 11/322,937 titled "Techniques For Generating Information Using A Remote Control" and filed on Dec. 30, 2005; a commonly owned U.S. patent application Ser. No. 11/322,580 titled "A User Interface with Software Lensing" and filed on Dec. 30, 2005; a commonly owned U.S. patent application Ser. No. 11/761,881 titled "A User Interface for Fast Channel Browsing" and filed on Jun. 12, 2007; and a commonly owned U.S. patent application Ser. No. 11/761,872 titled "Channel Lineup Reorganization Based on Metadata" and filed on Jun. 12, 2007, all of which are incorporated herein by reference.

BACKGROUND

The introduction of digital content into today's homes creates new challenges and opportunities for content providers and consumers. For example, today's homes may have one or more electronic devices that process and/or store content, such as personal computers (PCs), televisions, digital video disk (DVD) players, video cassette recorder (VCR) players, compact disk (CD) players, set-top boxes, stereo receivers, audio/video receivers (AVRs), media centers, personal video recorders (PVRs), gaming devices, digital camcorders, digital cameras, and so forth. These all may be networked together in such a way to provide a user with a means for entertainment via the home entertainment center and a single display device.

The networked digital home environment provides a user with many options to choose from when the user is searching for available media content. For example, the number of available options may be in the thousands or even in the tens of thousands. This many available options means that a very long list of items is displayed to the user from which he or she may select. However, the navigation and/or manipulation of a very long list of items are slow and confusing. This is especially true with today's user interfaces via a standard television remote control.

DETAILED DESCRIPTION

Various embodiments may be directed to a user interface utilizing various software lensing techniques for very long lists of available content. The software lensing techniques may be used for various applications. For example, the software lensing techniques may be used to navigate through an index list for a large list of content in such a way that a user is not required to "page through", "tab" or "scroll through" the options. In embodiments, the user is able to traverse very long lists of options with two simple slider-type motions. Other embodiments are described and claimed.

Various embodiments may include a user interface arranged to accept user input from a remote control. For example, the user interface module may be arranged to receive movement information representing pointing movements of the remote control. The remote control may be arranged to provide movement information as a user moves the remote control through space, such as moving the remote control to point to different objects displayed on a screen. In this manner, a user may enter information into a media device such as a television or set top box using the remote control as an "air" mouse or free-form pointing device. Alternatively, a user may provide movement information to the user interface module using other pointing devices implemented as either separate from the remote control or integrated with the remote control. The embodiments are not limited in this context.

In various embodiments, the user interface may be used to navigate through items or information objects representing media information on a display. Media information may include, but are not limited to, alphanumeric text, symbols, images, graphics, and so forth. A media tensing module may use software tensing techniques to increase a size for a information object when the pointer approaches or coincides with the information object. Other embodiments are described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
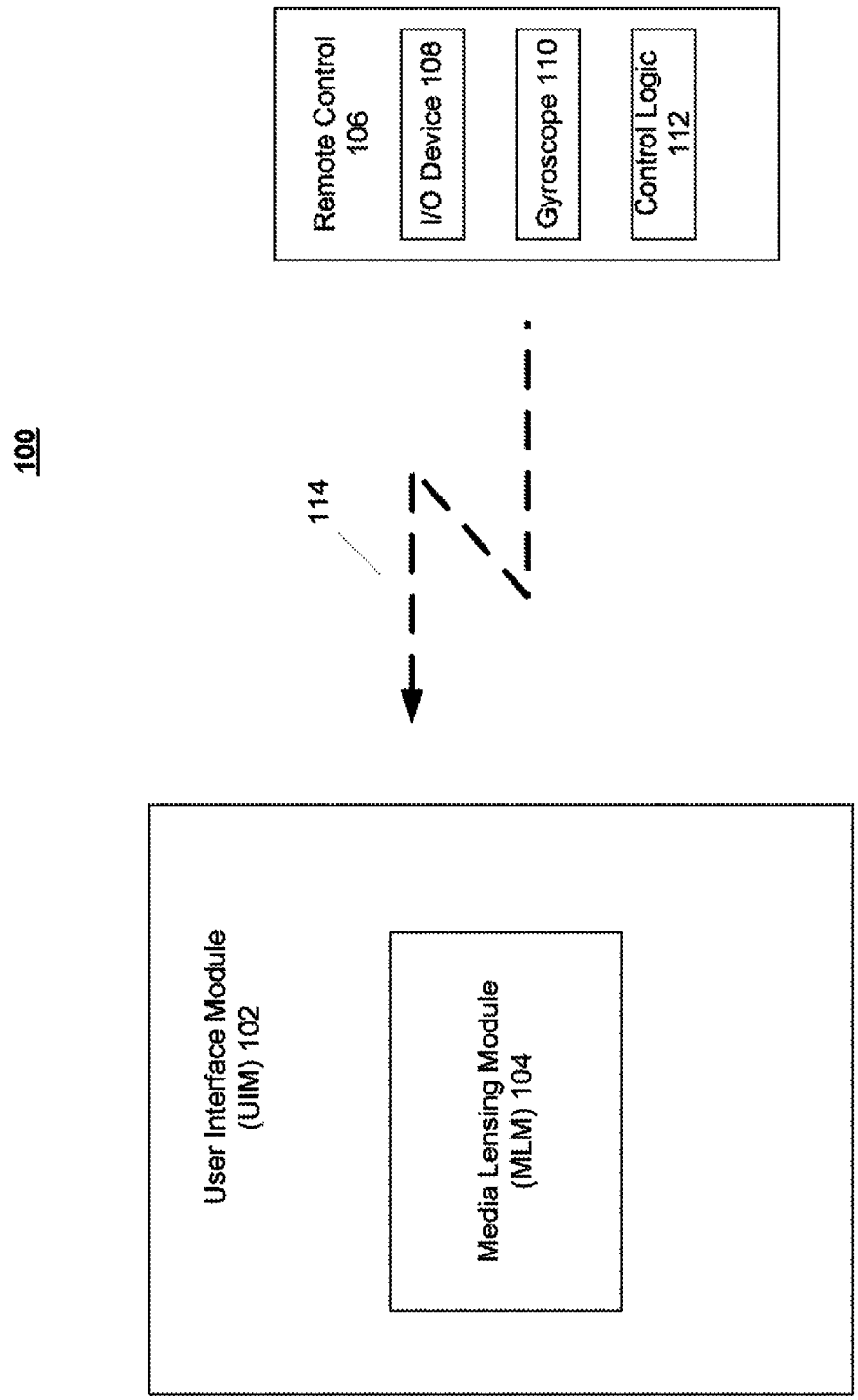
FIG. 1 illustrates one embodiment of an environment.

FIG. 1 illustrates one embodiment of an environment in which embodiments of the invention may operate. Referring to FIG. 1, the environment may include a user interface module (UIM) 102 and a remote control 106. UIM 102 may include a media lensing module (MLM) 104. Remote control 106 may include an input/output (I/O) device 108, a gyroscope 110 and control logic 112. Each of these elements is described next in more detail.

In one embodiment, for example, a media processing subsystem may include various application programs, such as UIM 102. For example, UIM 102 may comprise a GUI to communicate information between a user and the media processing sub-system. UIM 102 may be used to navigate through large amounts of available media options (i.e., a very long list of items), for example, via a networked digital home environment. Although embodiments of the invention may be described herein with reference to a networked digital home environment, this is not meant to limit the invention and is provided for illustration purposes only. An example media processing sub-system will be described in detail below with reference to FIG. 5.

In various embodiments, UIM 102 may include MLM 104. Alternatively, MLM 104 may be a separate component from UIM 102. MLM 104 may include the appropriate interfaces (e.g., API) to communicate information with UIM 102. MLM 104 may implement different software lensing techniques to increase, enlarge or magnify a size for an information object (e.g. media option) on a display when the pointer coincides with the information object, or the pointer is within a predefined distance from the information object. Software lensing techniques can be performed in one or two dimensions. In the case where the information object comprises text information, for example, information objects are arranged in one dimension MLM 104 may increase a size for the text information when a cursor or pointer coincides or approaches the media option. This is described in more detail below with reference to FIGS. 2-4.

In various embodiments, UIM 102 may be arranged to receive user input via remote control 106. Remote control 106 may be arranged to allow a user to perform pointing operations similar to a mouse or other pointing device using gyroscope 110. UIM 102 and remote control 106 allow a user to control a pointer on a display even when situated a relatively far distance from the display, such as normal viewing distance (e.g., 10 feet or more), and without the need for typical wired connections.

Remote control 106 may be arranged to control, manage or operate the media processing sub-system of UIM 102 by communicating control information using infrared (IR) or radio-frequency (RF) signals. In one embodiment, for example, remote control 106 may include one or more light-emitting diodes (LED) to generate the infrared signals. The carrier frequency and data rate of such infrared signals may vary according to a given implementation. An infrared remote control may typically send the control information in a low-speed burst, typically for distances of approximately 30 feet or more. In another embodiment, for example, remote control 106 may include an RF transceiver. The RF transceiver may match the RF transceiver used by the media processing sub-system. An RF remote control typically has a greater distance than an IR remote control, and may also have the added benefits of greater bandwidth and removing the need for line-of-sight operations. For example, an RF remote control may be used to access devices behind objects such as cabinet doors.

The control information may include one or more IR or RF remote control command codes ("command codes") corresponding to various operations that the device is capable of performing. The command codes may be assigned to one or more keys or buttons included with the I/O device 108 for remote control 106. I/O device 108 may comprise various hardware or software buttons, switches, controls or toggles to accept user commands. For example, I/O device 108 may include a numeric keypad, arrow buttons, selection buttons, power buttons, mode buttons, selection buttons, menu buttons, and other controls needed to perform the normal control operations typically found in conventional remote controls. There are many different types of coding systems and command codes, and generally different manufacturers may use different command codes for controlling a given device.

In addition to I/O device 108, remote control 106 may also include elements that allow a user to enter information into a user interface at a distance by moving the remote control through the air in two or three dimensional space. For example, remote control 106 may include gyroscope 110 and control logic 112. Gyroscope 110 may comprise a gyroscope typically used for pointing devices, remote controls and game controllers. For example, gyroscope 110 may comprise a miniature optical spin gyroscope. Gyroscope 110 may be an inertial sensor arranged to detect natural hand motions to move a cursor or graphic on a display, such as a television screen or computer monitor. Gyroscope 110 and control logic 112 may be components for an "In Air" motion-sensing technology that can measure the angle and speed of deviation to move a cursor or other indicator between Point A and Point B, allowing users to select content or enable features on a device waving or pointing remote control 106 in the air. In this arrangement, remote control 106 may be used for various applications, to include providing device control, content indexing, computer pointers, game controllers, content navigation and distribution to fixed and mobile components through a single, hand-held user interface device.

Although some embodiments are described with remote control 106 using a gyroscope 110 by way of example, it may be appreciated that other free-space pointing devices may also be used with remote control 106 or in lieu of remote control 106. For example, some embodiments may use a free-space pointing device made by Hillcrest Labs™ for use with the Welcome HoME™ system, a media center remote control such as WavIt MC™ made by ThinkOptics, Inc., a game controller such as WavIt XT™ made by ThinkOptics, Inc., a business presenter such as WavIt XB™ made by ThinkOptics, Inc., free-space pointing devices using accelerometers, and so forth. The embodiments are not limited in this context.

In one embodiment, for example, gyroscope 110 and control logic 112 may be implemented using the MG1101 and accompanying software and controllers as made by Thomson's Gyration, Inc., Saratoga, Calif. The MG1101 is a dual-axis miniature rate gyroscope that is self-contained for integration into human input devices such as remote control 106. The MG1101 has a tri-axial vibratory structure that isolates the vibrating elements to decrease potential drift and improve shock resistance. The MG1101 can be mounted directly to a printed circuit board without additional shock mounting. The MG1101 uses an electromagnetic transducer design and a single etched beam structure that utilizes the "Coriolis Effect" to sense rotation in two axes simultaneously. The MG1101 includes an integrated analog-to-digital converter (ADC) and communicates via a conventional 2-wire serial interface bus allowing the MG1101 to connect directly to a microcontroller with no additional hardware. The MG1101 further includes memory, such as 1K of available EEPROM storage on board, for example. Although the MG1101 is provided by way of example, other gyroscope technology may be implemented for gyroscope 110 and control logic 112 as desired for a given implementation. The embodiments are not limited in this context.

In operation, a user may use remote control 106 to provide information for the user interface module 102 at a distance by moving remote control 106 through the air, similar to an air mouse. For example, a user may point remote control 106 to various objects displayed on the display. Gyroscope 110 may sense the movements of remote control 106, and send movement information representing the movements to a media processing node over wireless communications media 114. UIM 102 may receive the movement information, and move a pointer (e.g., mouse pointer) or cursor in accordance with the movement information on the display. UIM 102 may use the movement information and associated selection commands to perform any number of user defined operations for a networked digital home network, such as navigating option menus, selecting options, searching for media content, selecting media objects, and so forth.

In addition to operating as an air mouse or pointing device using gyroscope 110 and control logic 112, remote control 106 may use other techniques to control a pointer. For example, remote control 106 may include an integrated pointing device. The pointing device may include various types of pointer controls, such as a track or roller ball, a pointing stick or nub, a joystick, arrow keys, direction keys, and so forth. Integrating a pointing device with remote control 106 may facilitate pointing operations for a user. Alternatively, a user may use a pointing device separate from remote control 106, such as various different types of mice or controllers. The pointing device may also be part of another device other than remote control 106, such as a wired or wireless keyboard. The particular implementation for the pointing device may vary as long as the pointing device provides movement information for the user interface module and allows a user to generate the movement information from a distance (e.g., normal viewing distance). The embodiments are not limited in this context.

As discussed above, the networked digital home environment of today provides a user with many options to choose from when the user is searching for available media content. For example, the number of options may be in the thousands or even in the tens of thousands. This many available options means that a very long list of items is displayed to the user from which he or she may select. Embodiments of the invention provide for a way to allow the user to navigate and select from a very long list of items without "paging through", "tabbing" or "scrolling through" the options. In embodiments, the user is able to traverse very long lists of options with two simple slider-type motions.

At a high level, and in an embodiment, the user may be asked to provide search criteria that represent the type of content in which the user is interested. A typical search engine may be used to pre-filter all of the available media content via the digital home network and to generate a first list of options based on the provided search criteria. An index list is then created for the first list of options. The index list may be visibly displayed in a vertical manner in such a way as to represent the number of options associated with each item in the index list. Based on the number of options associated with each item in the index list, a size for an aperture box or icon is dynamically determined.

With a simple slider-type motion, the user moves the aperture box over the index list. As the aperture box is moved over the index list, a software lens list is dynamically adjusted to represent the options centered around the position of the aperture box on the index list. As the software lens list is dynamically adjusted, the corners of the aperture box are dynamically and visibly connected to the top and bottom of the software lens list. The lines drawn to connect to the top and bottom of the software lens list visibly help the user to understand how the aperture box relates to the software lens list. As a cursor or pointer is moved over the software lens list via a simple slider-type motion, the text of the option under the cursor is magnified. Here, the user is allowed to make a selection from the software lens list. Embodiments of various user interface displays are discussed next in more detail with reference to FIGS. 2 and 3.

Figure 2:
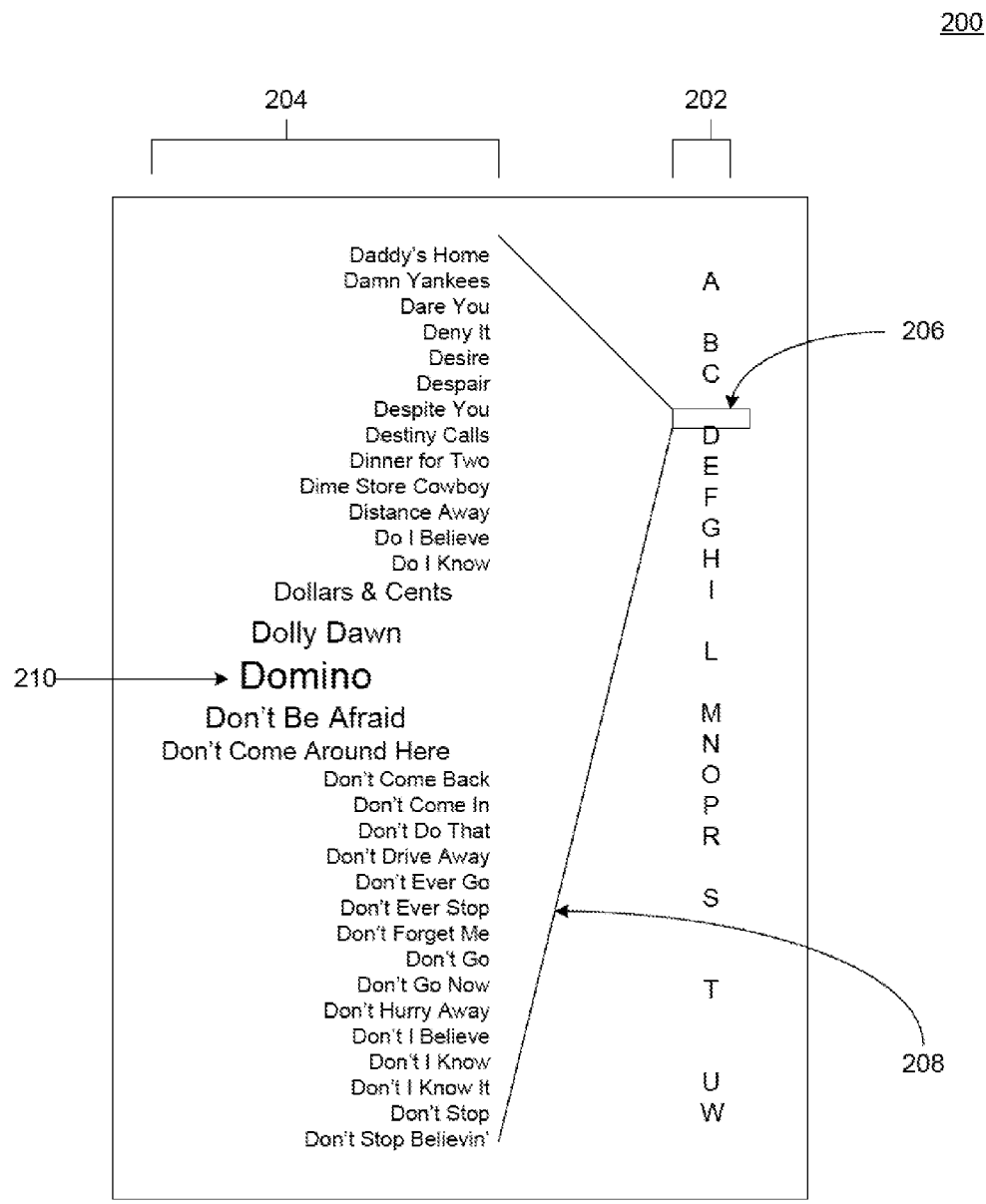
FIG. 2 illustrates one embodiment of a user interface display.

FIG. 2 illustrates one embodiment of a user interface display 200. User interface display 200 may provide an example of a GUI display generated by UIM 102. As shown in FIG. 2, user interface display 200 may display a first display column of information objects comprising text information. The first display column represents an index list 202.

User interface display 200 may also display a second display column of information objects comprising text information. The information objects of second display column may be associated with, or related to, one or more information objects from first display column. The second display column represents a software lens list 204.

It may be appreciated that the various elements of user interface display 200 are provided by way of example only, and more or less elements in different arrangements may be used by UIM 102 and still fall within the intended scope of the embodiments. The embodiments are not limited in this context.

As shown in FIG. 2, software lens list 204 may comprise multiple information objects presented in a vertical, stacked or list format. In general, UIM 102 may display a greater number of information objects as the size of each individual information object is decreased, and vice-versa. For example, the information objects of software lens list 204 as shown in user interface display 200 may be relatively small. In some cases, for example, the information objects may have a font size that is beyond the visual range of many viewers. Software lens list 204 may display a relative large number of information objects due in part to the smaller font size of each individual information object.

For example, assume that the user is interested in searching music titles, and in particular "rock" music. The user may enter "rock music titles" as the search criteria. A typical search engine may be used to pre-filter all of the available media content via the digital home network and to generate a first list of options based on the provided search criteria. Assume that the search engine produces approximately one thousand rock music titles available via the digital home network. Thus, the first list of options represents approximately one thousand rock music titles.

In embodiments, index list 202 is created for the first list of options. In the example illustrated in FIG. 2, index list 202 is comprised of all of the first letters represented by the rock music titles in the first list of options. Referring to the example in FIG. 2, index list 202 is comprised of the following letters: A-I, L-P, R-U and W. Thus, in one embodiment, all of the one thousand rock music titles in the first list of options start with one of these letters. In other embodiments, it is not possible for index list 202 to display all of its items. Here, an abbreviated index list 202 may be displayed. For example, if there is only one title starting with the letter "V", then the letter "V" for index list 202 may not be displayed since it represents a very low number of titles.

Index list 202 may be visibly displayed in a vertical manner in such a way as to represent the proportional number of options associated with each item in index list 202. An example of this is illustrated in FIG. 2 where "A" represents approximately twice the space as "B" in index list 202. Thus, there is approximately twice the number of rock music titles in the first list of options that start with the letter "A" than there are that start with the letter "B".

The vertical size of aperture box 206 is dynamically drawn to represent a manageable number of rock music titles to be displayed in software lens list 204. For example, assume that approximately forty to sixty titles is determined to be a manageable number for the software lens list 204 based on the screen resolution and the ability for a user to interact with the system. The vertical size of aperture box 206 is drawn in such as way that when the user moves the aperture box over the index list, the number of rock music titles centered around aperture box 206 is approximately forty to sixty. As aperture box 206 is moved over index list 202, software lens list 204 is dynamically adjusted to list what is now being represented within aperture box 206. As illustrated in FIG. 2, aperture box 206 is positioned close to the letter "D" in index list 202. Thus, software lens list 204 is dynamically adjusted to include rock music titles that start with the letter "D".

As software lens list 204 is dynamically adjusted, the corners of aperture box 206 are dynamically and visibly connected to the top and bottom of software lens list 204, as illustrated by lines 208. Lines 208 are drawn to connect to the top and bottom of software lens list 204 and visibly help the user to understand how aperture box 206 relates to software lens list 204.

As cursor or pointer 210 approaches or coincides with a rock music title in software lens list 204, MLM 104 may increase the font size for the title thereby making the text information for the title large enough for viewing by a user in a real time fashion, just as if a magnifying glass were attached to cursor 210 (e.g., software lensing). MLM 104 may also increase the font size for the title within a predefined area around the title of interest, such as adjacent to or near the title under cursor 210. This may allow a user to read some of the titles within a certain predefined area around the title of interest. The size of the surrounding titles, however, is typically smaller than the size of the title of interest, thereby allowing a user to more readily discern the title of interest. Color may be used as well to provide visual unambiguous feedback to the user which title is currently the title of interest. In this manner, user interface display 200 may convey a relatively larger amount of information (e.g., rock music titles) to a viewer via a display, but only the area of interest plus any surrounding text is large enough to read by a viewer as controlled by the viewer via remote control 106. This may be accomplished while reducing the need for scrolling, paging or indexing operations as implemented by conventional user interfaces.

Figure 3:
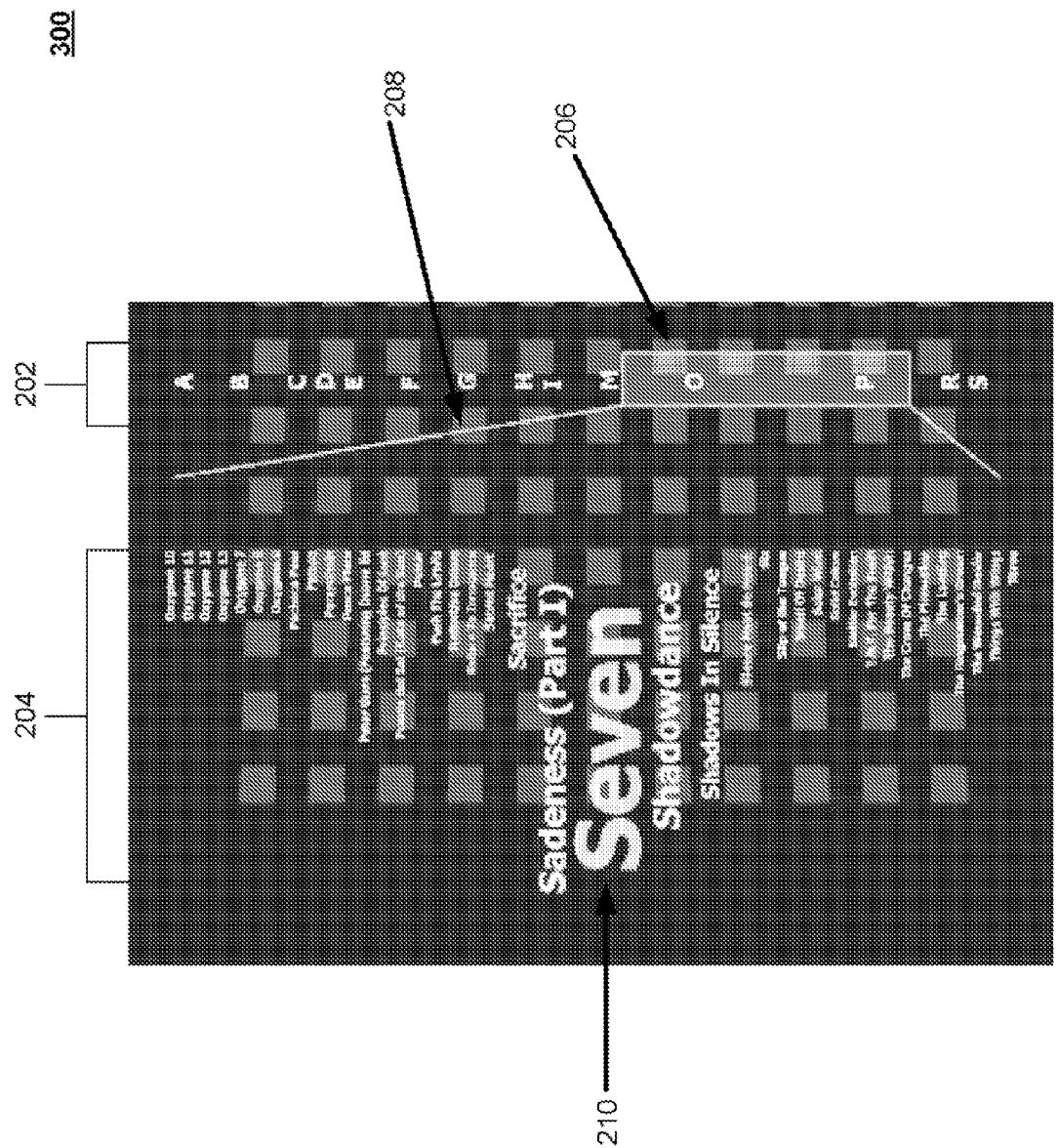
FIG. 3 illustrates one embodiment of a user interface display.

As discussed above, the vertical size of aperture box 206 is dynamically drawn to represent a manageable number of options to be displayed in software lens list 204. FIG. 3 illustrates one embodiment of a user interface display 300 where aperture box 206 is drawn much larger than that of aperture box of FIG. 2. Assuming that approximately forty to sixty titles is determined to be a manageable number of options, the number of rock music titles centered around aperture box 206 in both FIG. 3 is approximately forty to sixty (as it was for aperture box 206 of FIG. 2). The embodiments of FIGS. 2 and 3 are provided for illustration purposes only and are not meant to limit the invention.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
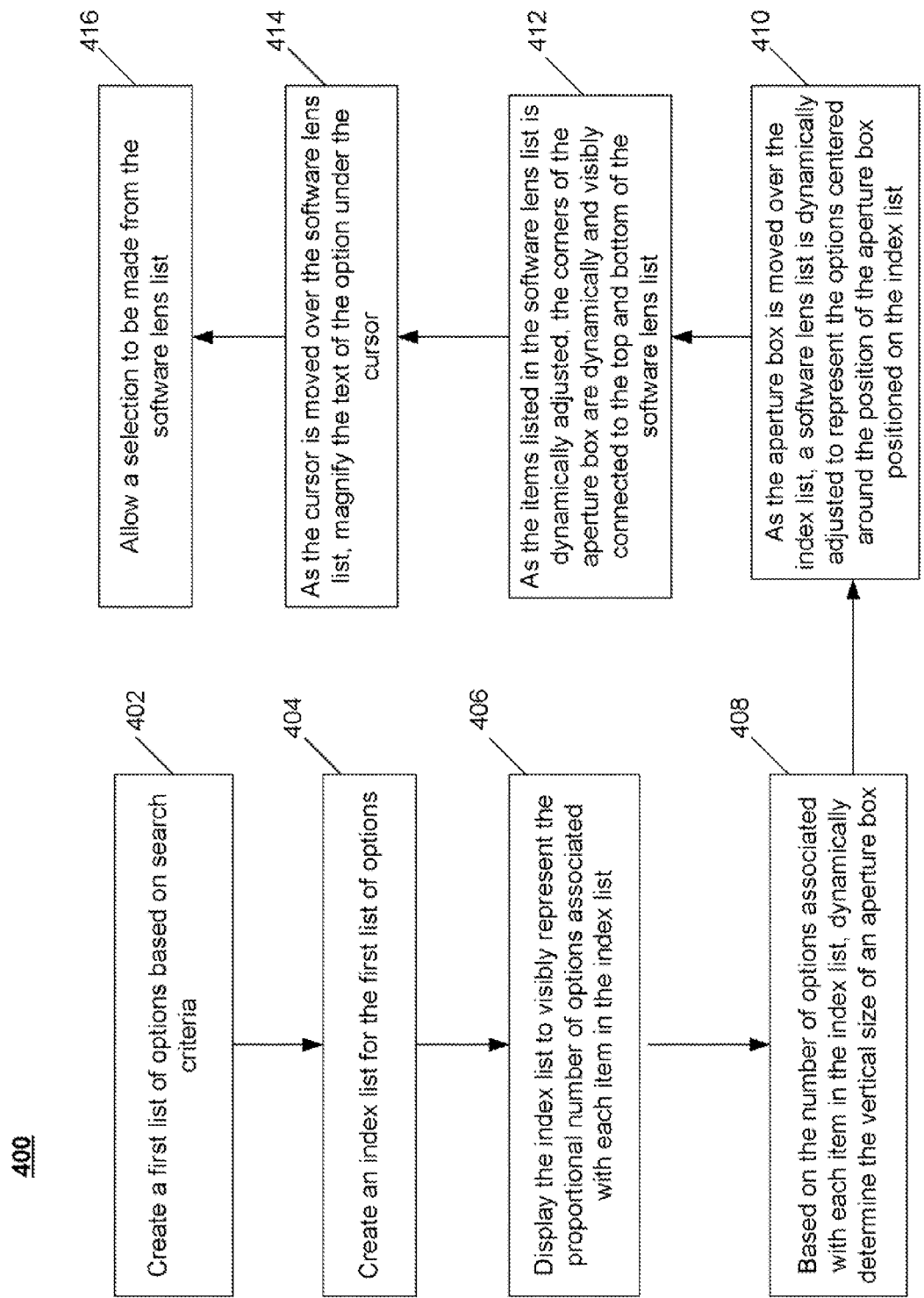
FIG. 4 illustrates one embodiment of a logic flow.

FIG. 4 illustrates one embodiment of a logic flow. FIG. 4 illustrates a logic flow 400. Logic flow 400 may be representative of the operations executed by one or more embodiments described herein, such as UIM 102, and/or MLM 104. Referring to FIG. 4, a first list of options is created based on search criteria (block 402). An index list is then created for the first list of options (block 404). The index list may be visibly displayed in a vertical manner in such a way as to represent the proportional number of options associated with each item in the index list (block 406).

Based on the number of options associated with each item in the index list, the vertical size for an aperture box is dynamically determined (block 408). As the aperture box is moved over the index list via a simple slider-type motion, a software lens list is dynamically adjusted to represent the options centered around the position of the aperture box on the index list (block 410). As the items listed in the software lens list is dynamically adjusted to list what is now being represented within aperture box 206, the corners of the aperture box are dynamically and visibly connected to the top and bottom of the software lens list (block 412). As a cursor or pointer is moved over the software lens list via a simple slider-type motion, the text of the option under the cursor is magnified (block 414). Here, the user is allowed to make a selection from the software lens list (block 416).

Figure 5:
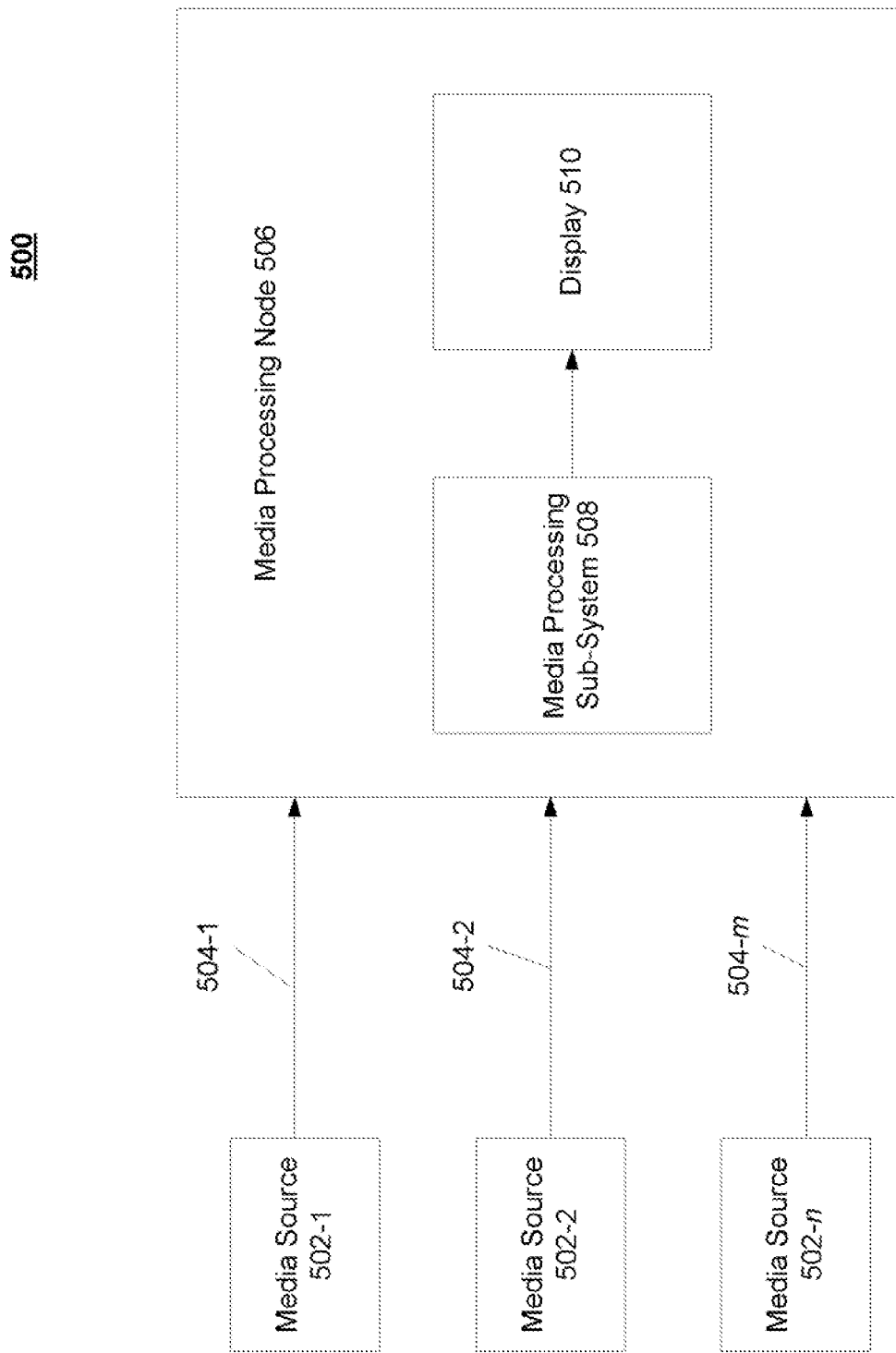
FIG. 5 illustrates one embodiment of a media processing system.

FIG. 5 illustrates one embodiment of a media processing system in which some embodiments of the invention may operate. FIG. 5 illustrates a block diagram of a media processing system 500. In one embodiment, system 500 may represent a networked digital home environment, although system 500 is not limited in this context.

In one embodiment, for example, media processing system 500 may include multiple nodes. A node may comprise any physical or logical entity for processing and/or communicating information in the system 500 and may be implemented as hardware, software, or any combination thereof, as desired for a given set of design parameters or performance constraints. Although FIG. 5 is shown with a limited number of nodes in a certain topology, it may be appreciated that system 500 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a television, a digital television, a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. The embodiments are not limited in this context.

In various embodiments, media processing system 500 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NISC) standard, the Advanced Television Systems Committee (ATSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the DVB Satellite (DVB-S) broadcasting standard, the DVB Cable (DVB-C) broadcasting standard, the Open Cable standard, the Society of Motion Picture and Television Engineers (SMPTE) Video-Codec (VC-1) standard, the ITU/IEC H.263 standard. Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of media processing system 500 may be arranged to communicate, manage or process different types of information, such as media information and control information. Examples of media information may generally include any data or signals representing content meant for a user, such as media content, voice information, video information, audio information, image information, textual information, numerical information, alphanumeric symbols, graphics, and so forth. Control information may refer to any data or signals representing commands, instructions or control words meant for an automated system. For example, control information may be used to route media information through a system, to establish a connection between devices, instruct a node to process the media information in a predetermined manner, monitor or communicate status, perform synchronization, and so forth. The embodiments are not limited in this context.

In various embodiments, media processing system 500 may be implemented as a wired communication system, a wireless communication system, or a combination of both. Although media processing system 500 may be illustrated using a particular communications media by way of example, it may be appreciated that the principles and techniques discussed herein may be implemented using any type of communication media and accompanying technology. The embodiments are not limited in this context.

In various embodiments, media processing system 500 may include one or more media, source nodes 502-1-$n$. Media source nodes 502-1-$n$ may comprise any media source capable of sourcing or delivering media information and/or control information to media processing node 506. More particularly, media source nodes 502-1-$n$ may comprise any media source capable of sourcing or delivering digital audio and/or video (AV) signals to media processing node 506. Examples of media source nodes 502-1-$n$ may include any hardware or software element capable of storing and/or delivering media information, such as a DVD device, a VHS device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, digital audio devices (e.g., MP3 players), and so forth. Other examples of media source nodes 502-1-$n$ may include media distribution systems to provide broadcast or streaming analog or digital AV signals to media processing node 506. Examples of media distribution systems may include, for example. Over The Air (OTA) broadcast systems, terrestrial cable systems (CATV), satellite broadcast systems, and so forth. It is worthy to note that media source nodes 502-1-$n$ may be internal or external to media processing node 506, depending upon a given implementation. The embodiments are not limited in this context.

In various embodiments, media processing system 500 may comprise a media processing node 506 to connect to media source nodes 502-1-$n$ over one or more communications media 504-1-$m$. Media processing node 506 may comprise any node that is arranged to process media information received from media source nodes 502-1-$n$.

In various embodiments, media processing node 506 may include a media processing sub-system 508. Media processing sub-system 508 may comprise a processor, memory, and application hardware and/or software arranged to process media information received from media source nodes 502-1-$n$. For example, media processing sub-system 508 may be arranged to perform various media operations and user interface operations as described in more detail below. Media processing sub-system 508 may output the processed media information to a display 510. The embodiments are not limited in this context.

To facilitate operations, media processing sub-system 508 may include a user interface module and a media lensing module (such as UIM 102 and MLM 104 of FIG. 1) to provide software lensing and remote user input. Software lensing may refer to techniques for increasing, enlarging, or magnifying an area when a pointer or cursor coincides or approaches the area. This may be accomplished in real time with reduced delay, rather than by selection or loitering over a given area for a certain amount of time as in conventional techniques. Although software lensing is typically implemented in software, it may be appreciated that all or portions of the software lensing technique may be performed by software, hardware, or a combination of both. The embodiments are not limited in this context.

In various embodiments, the user interface module may allow a user to control certain operations of media processing node 506, such as various system programs or application programs. For example, assume media processing node 506 comprises a television that has access to user menu options provided via media source node 502-1-$n$. These menu options may be provided for viewing or listening to media content reproduced or provided by media source node 502-1-$n$. The user interface module may display user options to a viewer on display 510 in the form of a graphic user interface (GUI), for example. In such cases, a remote control (such as remote control 106 of FIG. 1) is typically used to navigate through such basic options.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory. The media or article may comprise memory, removable or non-removable media, erasable or non-erasable media, writeable or re-writeable media, digital or analog media, hard disk, floppy disk. Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a processor;
a memory; and
a program, wherein the program, when stored in the memory and configured to be executed by the processor, includes instructions for:
a user interface module to display an index list, a software lens list, and an aperture box, wherein the index list represents a list of available options that represent search results returned by a search performed on the basis of search criteria provided by a user, and wherein the software lens list lists a set of available items that are collectively represented by one or more options enclosed by the aperture box on the index list; and
a media lensing module to increase a size of an item in the software lens list to a first size when a pointer coincides with the item, and to increase the size of adjacent items to a second size that is less than the first size,
wherein the list of available options in the index list includes letters of the alphabet, where each listed letter represents a plurality of search results that are a plurality of items starting with that letter, and wherein each letter representing one or more search results but less than a predetermined number of search results is omitted from the index list,
wherein an option in the index list representing a longer software lens list occupies a proportionally larger area than an option representing a shorter software lens list and the aperture box varies in size according to the number of items in the software lens list corresponding to the one or more options enclosed by the aperture box, and
wherein, when the aperture box encloses an area in the index list in which a letter was omitted from the index list, the user interface module displays one or more items which are the one or more search results, respectively, for the omitted letter in the index list.

2. The apparatus of claim 1, wherein said user interface module to display lines from the aperture box to a top and a bottom of the software lens list.

3. The apparatus of claim 1, wherein said user interface module to receive movement information from a remote control, and move said pointer in response to said movement information.

4. The apparatus of claim 3, wherein the remote control is a free-form pointing device.

5. A system, comprising:
a wireless receiver to receive movement information from a remote control;
a processor;
a memory; and
a program, wherein the program, when stored in the memory and configured to be executed by the processor, includes instructions for:
a user interface module to display an index list, a software lens list, and an aperture box, and to move a pointer in response to the movement information, wherein the index list represents a list of available options that represent search results returned by a search performed on the basis of search criteria provided by a user, and wherein the software lens list lists a set of available items that are collectively represented by one or more options enclosed by the aperture box on the index list; and
a media lensing module to increase a size of an item in the software lens list to a first size when a pointer coincides with the item, and to increase the size of adjacent items to a second size that is less than the first size,
wherein the list of available options in the index list includes letters of the alphabet, where each listed letter represents a plurality of search results that are a plurality of items starting with that letter, and wherein each letter representing one or more search results but less than a predetermined number of search results is omitted from the index list,
wherein an option in the index list representing a longer software lens list occupies a proportionally larger area than an option representing a shorter software lens list and the aperture box varies in size according to the number of items in the software lens list corresponding to the one or more options enclosed by the aperture box, and
wherein, when the aperture box encloses an area in the index list in which a letter was omitted from the index list, the user interface module displays one or more items which are the one or more search results, respectively, for the omitted letter in the index list.

6. The system of claim 5, wherein said user interface module to display lines from the aperture box to a top and a bottom of the software lens list.

7. The system of claim 5, wherein the remote control is a free-form pointing device.

8. A method, comprising:
displaying an index list, a software lens list, and an aperture box, wherein the index list represents a list of available options that represent search results returned by a search performed on the basis of search criteria provided by a user, and wherein the software lens list lists a set of available items that are collectively represented by one or more options enclosed by the aperture box on the index list; and
increasing a size of an item in the software lens list to a first size when a pointer coincides with the item, and increasing the size of adjacent items to a second size that is less than the first size,
wherein the list of available options in the index list includes letters of the alphabet, where each listed letter represents a plurality of search results that are a plurality of items starting with that letter, and wherein each letter representing one or more search results but less than a predetermined number of search results is omitted from the index list,
wherein an option in the index list representing a longer software lens list occupies a proportionally larger area than an option representing a shorter software lens list and the aperture box varies in size according to the number of items in the software lens list corresponding to the one or more options enclosed by the aperture box, and
wherein, when the aperture box encloses an area in the index list in which a letter was omitted from the index list, the user interface module displays one or more items which are the one or more search results, respectively, for the omitted letter in the index list.

9. The method of claim 8, further comprising:
displaying lines from the aperture box to a top and a bottom of the software lens list.

10. The method of claim 8, further comprising:
receiving movement information from a remote control; and
moving the pointer in response to the movement information.

11. The method of claim 10, wherein the remote control is a free-form pointing device.

12. A machine-readable non-transitory medium containing instructions which, when executed by a processing system, cause the processing system to:
display an index list, a software lens list, and an aperture box, wherein the index list represents a list of available options that represent search results returned by a search performed on the basis of search criteria provided by a user, and wherein the software lens list lists a set of available items that are collectively represented by one or more options enclosed by the aperture box on the index list; and
increase a size of an item in the software lens list to a first size when a pointer coincides with the item, and increasing the size of adjacent items to a second size that is less than the first size,
wherein the list of available options in the index list includes letters of the alphabet, where each listed letter represents a plurality of search results that are a plurality of items starting with that letter, and wherein each letter representing one or more search results but less than a predetermined number of search results is omitted from the index list,
wherein an option in the index list representing a longer software lens list occupies a proportionally larger area than an option representing a shorter software lens list and the aperture box varies in size according to the number of items in the software lens list corresponding to the one or more options enclosed by the aperture box, and
wherein, when the aperture box encloses an area in the index list in which a letter was omitted from the index list, the user interface module displays one or more items which are the one or more search results, respectively, for the omitted letter in the index list.

13. The machine-readable medium of claim 12, further comprising:

displaying lines from the aperture box to a top and a bottom of the software lens list.

14. The machine-readable medium of claim 12, further comprising:

receiving movement information from a remote control; and moving the pointer in response to the movement information.

15. The machine-readable medium of claim 14, wherein the remote control is a free-form pointing device.

* * * * *